(12) United States Patent
Manouvrier

(10) Patent No.: US 9,372,354 B2
(45) Date of Patent: Jun. 21, 2016

(54) OPTICAL MODULATOR WITH AUTOMATIC BIAS CORRECTION

(71) Applicant: STMICROELECTRONICS SA, Montrouge (FR)

(72) Inventor: Jean-Robert Manouvrier, Echirolles (FR)

(73) Assignee: STMICROELECTRONICS SA, Montrouge (FR)

(*) Notice: Subject to any disclaimer, the term of this patent is extended or adjusted under 35 U.S.C. 154(b) by 164 days.

(21) Appl. No.: 14/182,033

(22) Filed: Feb. 17, 2014

(65) Prior Publication Data
US 2014/0241657 A1 Aug. 28, 2014

(30) Foreign Application Priority Data

Feb. 26, 2013 (FR) ..................................... 13 51675

(51) Int. Cl.
G02F 1/01 (2006.01)
G02F 1/025 (2006.01)
G01J 9/00 (2006.01)
G01J 9/02 (2006.01)
H04B 10/50 (2013.01)
G02F 1/21 (2006.01)

(52) U.S. Cl.
CPC ................. *G02F 1/0123* (2013.01); *G01J 9/00* (2013.01); *G01J 9/02* (2013.01); *G02F 1/025* (2013.01); *G02F 1/218* (2013.01); *H04B 10/5053* (2013.01); *H04B 10/50575* (2013.01)

(58) Field of Classification Search
CPC ..... G02F 2001/212; G02F 1/01; G02F 1/011; G02F 2203/20; G02F 1/0123; G01J 9/02
See application file for complete search history.

(56) References Cited

U.S. PATENT DOCUMENTS

| 4,759,627 | A | | 7/1988 | Thylen et al. | |
|---|---|---|---|---|---|
| 4,928,007 | A | * | 5/1990 | Furstenau | G02F 7/00 250/227.14 |
| 5,905,823 | A | * | 5/1999 | Shintaku | G02F 1/01 359/489.07 |
| 2010/0128336 | A1 | | 5/2010 | Witzens et al. | |
| 2014/0231627 | A1 | * | 8/2014 | Wakatsuki | H01Q 3/2676 250/208.2 |

FOREIGN PATENT DOCUMENTS

FR 2580072 10/1986

* cited by examiner

*Primary Examiner* — Daniel Petkovsek
(74) *Attorney, Agent, or Firm* — Allen, Dyer, Doppelt, Milbrath & Gilchrist, P.A.

(57) ABSTRACT

An optical modulator uses an optoelectronic phase comparator configured to provide, in the form of an electrical signal, a measure of a phase difference between two optical waves. The phase comparator includes an optical directional coupler having two coupled channels respectively defining two optical inputs for receiving the two optical waves to be compared. Two photodiodes are configured to respectively receive the optical output powers of the two channels of the directional coupler. An electrical circuit is configured to supply, as a measure of the optical phase shift, an electrical signal proportional to the difference between the electrical signals produced by the two photodiodes.

16 Claims, 3 Drawing Sheets

OPTICAL MODULATOR WITH AUTOMATIC BIAS CORRECTION

FIELD OF THE INVENTION

The invention relates to an optical modulator according to the Mach-Zehnder Interferometer principle, and, more particularly, to the stabilization of the operating point of the modulator with respect to variations of various external parameters.

BACKGROUND

FIG. 1 schematically shows an example of an optical modulator of Mach-Zehnder interferometer type, often called an MZI modulator. An optical wave having a power P0 arrives through a waveguide to an optical separation unit S1, a Y-separator here. The initial wave is separated into two half-power waves, respectively guided in two parallel, upper and lower branches. Each branch comprises, in series, a fast optical phase modulation diode HSPM ("High Speed Phase Modulator") and a slow optical phase adjusting diode PINPM.

Each of the diodes HSPM and PINPM introduces an adjustable phase delay of the optical wave crossing the diode by producing electric charge in the light path. The HSPM diode operates in reverse bias mode; electric charge is pulled from the junction into the optical path by a junction depletion phenomenon, the junction being offset relative to the optical path. The diode PINPM operates in a forward bias mode. It includes a P-I-N junction, the intrinsic region of which is in the light path and receives electrical charge by an injection phenomenon.

The diode PINPM reacts slowly to changes in its bias, but it has a wide range of phase delay adjustment—it is used to adjust an optimal quiescent phase delay in the branch. Thus, the diodes PINPM of the two branches (PINPM1 and PINPM2) receive respective constant bias currents depending on the quiescent phase delays to be introduced in the two branches.

The diode HSPM reacts quickly, but has a low phase modulation amplitude—it is used to modulate the phase delay with a digital signal to be transmitted around the quiescent phase delay established by the diode PINPM. Thus, the diodes HSPM of the two branches (HSPM1 and HSPM2) receive voltage signals that are modulated, based on the digital signal to be transmitted, between 0 and a positive value Vb. The voltage signals applied to the diodes HSPM1 and HSPM2 are complementary so as to produce a differential effect in the two branches.

The two branches reach an optical junction unit J1, here a directional coupler. The optical waves incident on the two channels of coupler J1 are shifted by 180° at rest, whereby, in the case of a symmetric coupler, the optical power P1, P2 delivered by each channel of the coupler J1 is 50% of the input power P0 of the modulator, the absorption losses in the branches being neglected. Diodes PINPM1 and PINPM2 are biased by different currents. For example, the diode PINPM2 is biased by a zero current introducing theoretically a zero phase delay, and the diode PINPM1 is biased by a current Ib selected to introduce a phase delay of 180°.

FIG. 2 is a diagram illustrating the variation of the transmission rate P1/P0 of the modulator, measured at the output of the upper channel of the coupler J1, as a function of the phase difference between the waves at the inputs of the coupler J1. The transmission rate P2/P0, not shown, at the output of the lower channel, varies inversely.

The initial phase shift of 180° introduced by the diodes PINPM places the operating point of the modulator at the inflection point of a sinusoid, in a region where the linearity is best and the slope is steepest. The diode HSPM1 causes the phase to vary in a range above 180°, while the diode HSPM2 causes the phase to vary symmetrically in a range below 180°. By limiting the amplitude of these ranges, the corresponding change in the rate of transmission may be almost linear. For the transmission of digital signals, the linearity is less important, but it may be preferable that the behavior of the modulator remains balanced, which is the case under the conditions of FIG. 2.

In practice, the bias currents of the diodes PINPM are individually adjusted for obtaining the desired quiescent conditions. However, a drift of the quiescent conditions may be noticeable, particularly as a function of temperature.

SUMMARY

Thus there is a need for compensating the drift in the quiescent conditions of an MZI modulator. It may also be desirable to avoid individual adjustment of the bias currents of modulators in a production environment.

These needs are addressed by an optoelectronic phase comparator configured to provide, in the form of an electrical signal, a measure of a phase difference between two optical waves. The phase comparator comprises an optical directional coupler having two coupled channels respectively defining two optical inputs for receiving the two optical waves to be compared. Two photodiodes are configured to respectively receive the optical output powers of the two channels of the directional coupler. An electrical circuit is configured to supply, as a measure of the optical phase shift, an electrical signal proportional to the difference between the electrical signals produced by the two photodiodes.

An MZI optical modulator may thus comprise an optical separation unit for separating an incoming optical wave into a first and a second optical wave; a first and a second optical phase adjusting diode inserted respectively in the paths of the first and second optical waves; and a first and a second optical directional coupler, each having first and second coupled channels, the first channels being inserted respectively in the paths of the first and second optical waves. The MZI optical modulator may also include an optoelectronic phase comparator as mentioned above, having its optical inputs respectively connected to the second channels of the first and second directional couplers; and a circuit for electrically biasing the phase adjusting diodes, connected in a control loop with the optoelectronic phase comparator.

According to an embodiment, the optical modulator comprises, between one of the optical inputs of the phase comparator and the second corresponding channel of the first or second directional coupler, an intermediate directional coupler connected such that the phase difference between the two optical waves incident on the inputs of the phase comparator is equal to 180°.

According to an embodiment, the optical modulator comprises an optical wave junction unit having two inputs connected respectively to the outputs of the first channels of the first and second directional couplers; and a first and a second optical phase modulation diode respectively inserted in the connections between the junction unit and the first and second directional couplers.

According to an embodiment, the separation unit and the junction unit are directional couplers, and the first and second phase adjustment diodes are biased so that they introduce a 90° phase delay one relative to the other.

According to an embodiment, the separation unit is a directional coupler, the junction unit is a Y-combiner, and the first and second phase adjustment diodes are biased to apply the same phase delay.

BRIEF DESCRIPTION OF THE DRAWINGS

Other advantages and features will become more clearly apparent from the following description of particular embodiments provided for exemplary purposes only and represented in the appended drawings, in which.

DETAILED DESCRIPTION OF THE EMBODIMENTS

A P-I-N diode of an MZI modulator, even if its bias current is zero, causes a nonzero optical phase delay, a residual phase shift. This residual phase shift depends on the characteristics obtained after manufacture, such as doping and dimensions. If the two PIN diodes of the modulator could be matched, they would provide the same residual phase shift, which would be offset by the differential structure of the modulator. However, the diodes PINPM, which are formed in optical waveguides, are large compared to diodes used for plain electronic functions, and located far apart from each other at the scale of a semiconductor chip. As a result, it is difficult to match these "optical" diodes, and unpredictable offsets that are too great to be neglected are generally observed between the residual phase shifts of the two diodes PINPM.

Despite an accurate adjustment of the bias currents, even in modulator configurations where the two diodes PINPM may have the same phase setting, the quiescent conditions drift with temperature. This drift may be explained by the fact that the rate of change of the phase shift as a function of temperature depends on the operating conditions of the diode PINPM. These operating conditions are generally not identical initially for the two diodes, whereby the phase shifts of the two diodes diverge when the temperature varies.

The HSPM diodes are also subject to difficulties in matching, but their structure is inherently less sensitive to variability of manufacturing processes. It is noted that the offset between the residual phase shifts of the two HSPM diodes, even after thermal drift, may remain within acceptable limits to be neglected.

FIGS. 3A through 3D show configurations of MZI modulators differing by combinations of separation and junction units requiring different bias conditions for the diodes PINPM. The structures of the two branches of the modulators are unchanged from FIG. 1.

Figure 1:
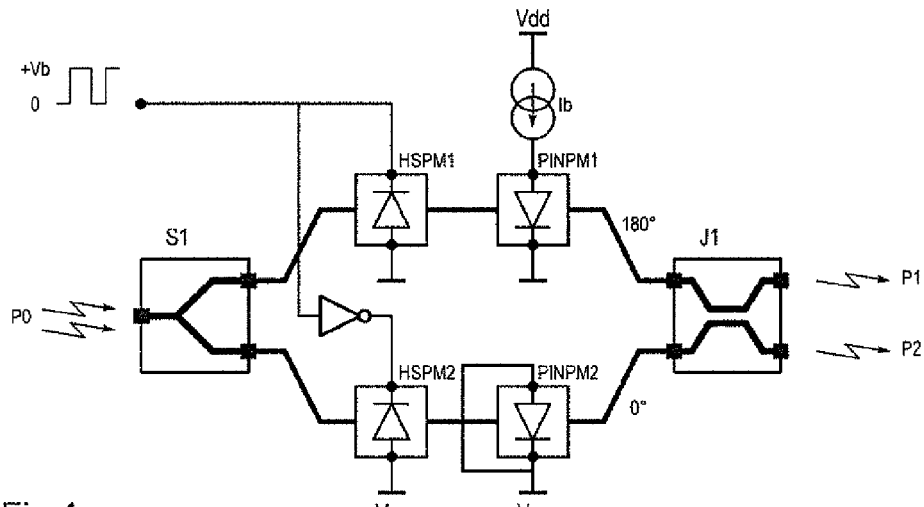
FIG. 1, previously described, schematically shows an exemplary Mach-Zehnder interferometer (MZI) modulator as in the prior art.
Figure 2:
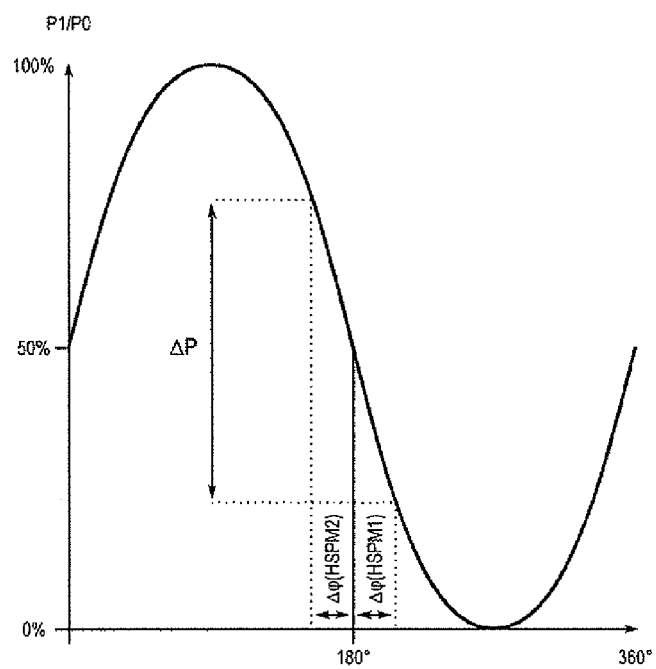
FIG. 2 is a graph illustrating the transmission rate of the modulator of FIG. 1 as a function of the phase difference between the optical waves of the two branches.
Figure 3A:
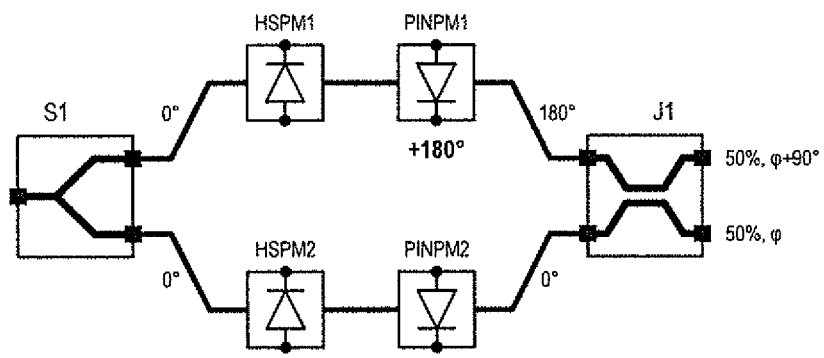
FIGS. 3A through 3D represent different configurations of an MZI modulator combining different types of optical separation and junction units according to the invention.

FIG. 3A corresponds to the configuration of FIG. 1, already described. The separation unit S1 is a Y-separator and the junction unit J1 is a symmetric directional coupler. Separator S1 maintains the phase of the input optical wave on both outputs, whereas the coupler J1 requires a phase difference of 180° to be in the center of its dynamic range, the desired quiescent condition. Thus, diodes PINPM1 and PINPM2 are biased to introduce an initial phase shift of 180° between the inputs of the coupler J1.

The two waves exiting the coupler J1 are in phase quadrature, but their phase difference with respect to the input waves is variable depending on the characteristics of the input waves.

Figure 3B:
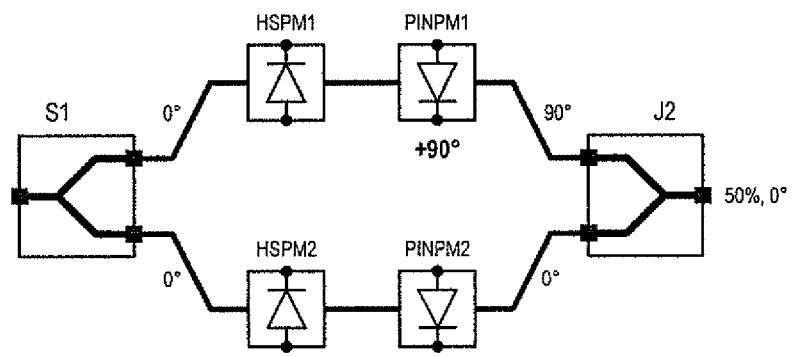

In FIG. 3B, the output directional coupler J1 has been replaced by a Y-combiner J2. Such a combiner transmits 50% of the optical power when the waves at its two inputs are in phase quadrature. The two waves arriving at the diodes PINPM being in phase, the diodes PINPM are biased to introduce the desired phase difference of 90° between the two waves. E.g. the diode PINPM1 is biased to introduce a phase delay of 90° and the diode PINPM2 receives a zero current, corresponding theoretically to a null phase delay. In practice, the diode PINPM2 introduces a residual phase delay at zero bias current, which is difficult to predict, for example 1°. In that case, the diode PINPM1 is biased for introducing a phase delay of 90+1=91°.

The configuration of FIG. 3B may be preferred to that of FIG. 3A, because the diode PINPM1 causes less absorption losses than in FIG. 3A. Indeed, a greater phase delay is obtained in FIG. 3A by injecting more charge in diode PINPM1, and absorption losses increase with the number of charges.

Figure 3C:
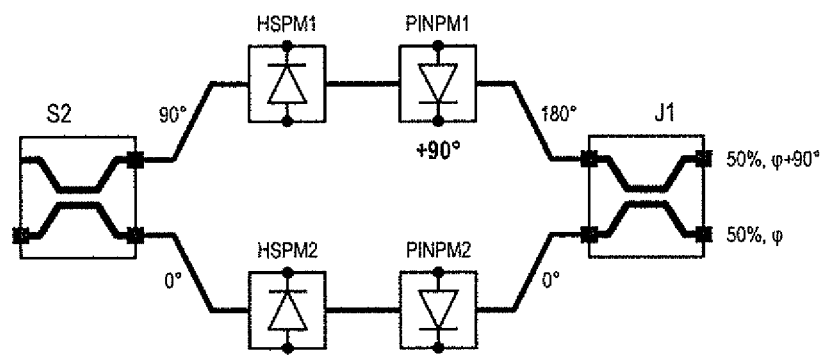

In FIG. 3C, the Y-separator S1 of FIG. 3A has been replaced by a symmetrical directional coupler S2. The input optical wave is applied to one of the channels of the coupler, for example the lower one. In that case, the wave exiting the upper channel of the coupler is delayed by 90° relative to the wave exiting the lower channel. The output coupler J1 requiring a phase difference of 180° to operate in the desired quiescent conditions, it is sufficient that the diode PINPM1 introduce a phase delay of 90° that is added to the delay of 90° introduced by the upper channel of the input coupler S2.

The absorption losses of the configuration of FIG. 3C are similar to those of FIG. 3B.

Figure 3D:
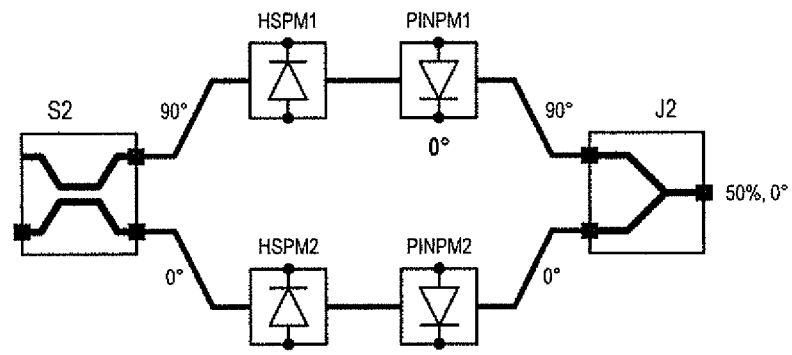

In FIG. 3D, the output directional coupler J1 of FIG. 3C has been replaced by a Y-combiner J2. The input coupler S2 directly produces the phase quadrature desired for the quiescent conditions, between the waves input to the combiner J2. Thus, the diodes PINPM need not introduce additional phase delay. In this case, the two diodes PINPM may be biased at zero current, in theory. This configuration therefore provides the best performance in terms of absorption losses.

Because the two diodes PINPM operate in similar conditions, this configuration also offers the best performance in terms of thermal drift.

In practice, the diode PINPM having the highest residual phase delay may be biased at zero current, while the other diode PINPM is biased with a current sufficient to balance the residual phase delay. As it is difficult to know in advance which of the two diodes PINPM has the highest residual phase delay, it is preferred to bias both diodes with non-zero currents, one fixed and one adjustable.

Figure 4:
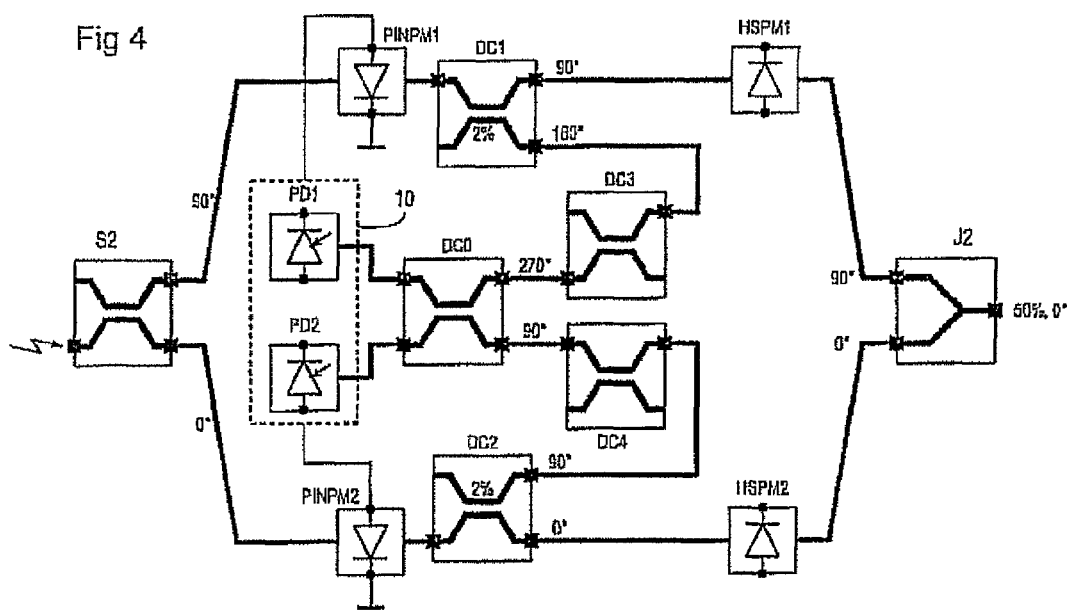
FIG. 4 shows an embodiment of an optoelectronic regulation circuit adapted to a first MZI modulator configuration according to the invention.

FIG. 4 shows an embodiment of an optoelectronic circuit for regulating the quiescent conditions of an MZI modulator. The MZI modulator has a configuration similar to that of FIG. 3D. With respect to FIGS. 3A to 3D, the positions of the diodes PINPM have been interchanged with those of the HSPM diodes, so that the diodes PINPM are the first elements in the two branches of the modulator, and are part of a control loop. The HSPM diodes are not included in the loop—as mentioned earlier, the drifts of the HSPM diodes may be neglected.

The optoelectronic regulation circuit, whose principles may be applied to various MZI modulator configurations, such as those illustrated in FIGS. 3A to 3D, measures the optical phase difference between the waves in the two branches of the modulator, and provides the error relative to a desired value in the form of optical power received by photodiodes PD1, PD2. The electrical signals provided by the photodiodes are exploited to vary the bias currents of the diodes PINPM in a direction tending to reduce the error.

The measurement of the phase difference may be achieved using a symmetrical optical directional coupler DC0 receiving, on its two channels, optical waves derived from the two branches of the modulator. The paths of the derived optical waves are configured so that the phase difference at the input of the coupler DC0 equals 180° when the phase difference between the derived optical waves corresponds to that desired at the input of the junction unit. Under these conditions, the coupler DC0 outputs at each of its channels 50% of the total optical power received. If the phase difference is not equal to 180°, one of the channels provides more than 50% of the power, while the other channel provides the complement. The optical waves at the outputs of the two channels of the coupler are provided to two respective photodiodes PD1, PD2. Thus, the difference between the electrical signals generated by the photodiodes represents the optical phase error.

In FIG. 4, more specifically, the optical outputs of diodes PINPM1 and PINPM2 are provided to the first channels of two respective asymmetric directional couplers DC1 and DC2. The outputs of these first channels are provided to diodes HSPM1 and HSPM2 respectively.

The couplers DC1 and DC2 are asymmetrical in that the optical power received in the first channel is distributed asymmetrically between the outputs of the first and second channels, for example 98% at the output of the first channel, and 2% at the output of the second channel. The fraction of the output power in the second channel is chosen to be detectable by a photodiode in good conditions.

The optical waves output by the second channels of the couplers DC1 and DC2 have respective phase delays of 180° and 90° relative to the optical wave input to the modulator (each of the couplers DC1 and DC2 introduces a phase delay of 90° as the wave passes from the first channel to the second). The phase difference between these waves is thus 90° while the coupler/comparator DC0 requires 180°. A symmetrical directional coupler DC3 is provided to add the missing 90° phase delay to the 180° optical wave. The coupler DC3 receives in its first channel the 180° wave and provides a 270° wave from its second channel to the upper channel of coupler/comparator DC0.

A directional coupler DC4 is provided to equalize the optical paths leading to the coupler/comparator DC0. Its first channel connects the coupler DC2 to the lower channel of the coupler DC0, without introducing a phase delay.

The outputs of the first and second channels of the coupler/comparator DC0 are respectively sensed by the photodiodes PD1 and PD2. These photodiodes are part of an electrical control circuit 10 configured to adjust the bias currents of the diodes PINPM according to the difference between the sensed optical powers. In this modulator configuration, the bias currents are substantially the same, since the diodes PINPM are designed to introduce the same phase delay (as close to 0° as possible.)

The regulator circuit of FIG. 4 is also usable, as is, in the modulator configuration of FIG. 3B.

Figure 5:
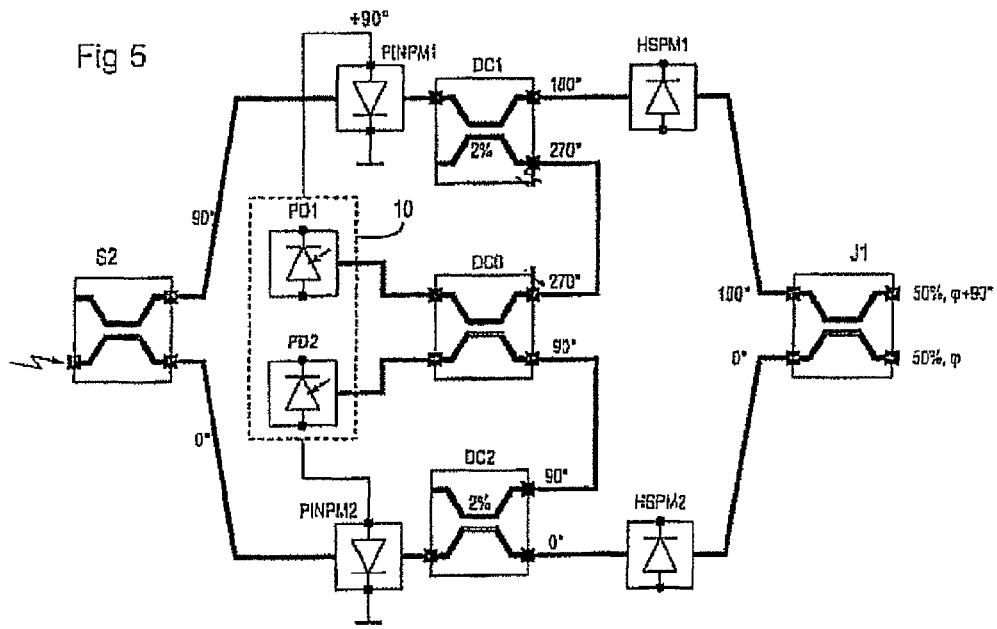
FIG. 5 shows an alternative embodiment of the optoelectronic regulation circuit adapted to another MZI modulator configuration according to the invention.

FIG. 5 shows an alternative of the optoelectronic regulation circuit, integrated with an MI modulator of the type of FIG. 3C. The same elements as in FIG. 4 are designated by the same references. The diode PINPM1 is biased here for introducing a phase delay of 90°, so that the second channel of the coupler DC1 provides an optical wave delayed by 270°. The second channel of the coupler DC2 still provides a wave delayed by 90°. The phase difference between these waves is 180°, whereby the two waves may be directly applied to the inputs of the coupler/comparator DC0.

The configuration of FIG. 5 is simpler than that of FIG. 4 in that it uses two directional couplers less.

The regulator circuit FIG. 5 is also usable, as is, in the modulator configuration of FIG. 3A.

Figure 6:
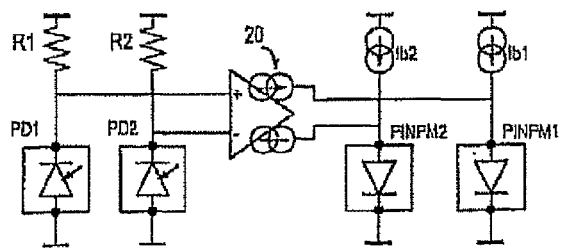
FIG. 6 shows a detailed example of an optoelectronic regulation circuit according to the invention.

FIG. 6 shows a detailed example of electronic circuitry of the optoelectronic regulation circuit 10. The photodiodes PD1 and PD2 are reverse biased by two resistors R1 and R2. The cathodes of diodes PD1 and PD2 are connected respectively to a non-inverting input and an inverting input of a differential transconductance amplifier 20. The diodes PINPM1 and PINPM2 are forward biased by respective constant current sources Ib1 and Ib2. The anodes of diodes PINPM1 and PINPM2 are connected to forward and reverse outputs of the amplifier 20.

The currents Ib1 and Ib2 are set by design to the typical values required to introduce the quiescent phase difference corresponding to the modulator configuration (180° for FIG. 3A, 90° for FIGS. 3B and 3C, and 0° for FIG. 3D). In theory, one of the currents (Ib2) may be zero. In practice, the two currents are non-zero, so that each has a margin of adjustment. Current Ib2 is selected, for example, to introduce a phase delay of 5°. Then, the current Ib1 is selected to introduce a phase delay of 185° in FIG. 3A, 95° in FIGS. 3B and 3C, and 5° in FIG. 3D.

When the phase difference between the input waves of coupler/comparator DC0 is 180°, each of the photodiodes PD1 and PD2 receives the same optical power, 50% of the power received by the coupler/comparator DC0. If the photodiodes are matched, which is easier to achieve than for diodes PINPM, their cathode voltages stand at identical values. Thus, the amplifier 20 sees a zero input voltage and does not influence the bias currents of the diodes PINPM.

If the phase difference between the input waves of coupler/comparator DC0 drops below 180°, it means that the delay introduced by the diode PINPM1 decreases or the delay introduced by the diode PINPM2 increases. The optical power received by photodiode PD1 increases, and the optical power received by the photodiode PD2 decreases. The cathode voltage of the photodiode PD1 increases and that of the photodiode PD2 decreases. The amplifier 20 sees its differential input become positive—it injects a proportional current in the diode PINPM1 and subtracts a proportional current from the diode PINPM2. The diode PINPM1 increases its phase delay while the diode PINPM2 decreases its phase delay.

A symmetrical behavior is obtained when the phase shift between the waves becomes greater than 180°.

An automatic correction is thus obtained for the quiescent phase errors in the modulator. This correction is independent of the nature of the error—the error may be due to a temperature drift, a poor matching between the diodes PINPM, a poor initial choice of the bias currents, or any other cause. The accuracy of the correction depends on the open loop gain of the control loop, which may be easily adjusted by way of amplifier 20.

The accuracy also depends on the parasitic offset referred to the input of the amplifier, caused for instance by a mismatch between the photodiodes or a lack of precision in the coupling coefficient of each of couplers DC0, DC1 and DC2. Such an offset may be compensated electrically by techniques known in the field of differential amplifiers.

What is claimed is:

1. A Mach-Zehnder interferometer optical modulator comprising:
   an optical separation unit configured to separate an incoming optical wave into a first and a second optical wave;
   a first and a second optical phase adjusting diode respectively in paths of the first and second optical waves;
   a first and a second optical directional coupler, each having first and second coupled channels, the first channels being coupled respectively in paths of the first and second optical waves;
   a phase comparator comprising
      a third optical directional coupler having two coupled channels respectively defining two optical inputs coupled to the second coupled channels of said first and second optical directional couplers, and
      two photodiodes configured to respectively receive optical outputs of the two coupled channels of said third optical directional coupler;
   a circuit configured to electrically bias said first and second phase adjusting diodes based upon said phase comparator;
   an optical wave junction unit having two inputs coupled respectively to outputs of the first channels of said first and second directional couplers; and
   a first and a second optical phase modulation diode respectively inserted between said optical wave junction unit and said first and second optical directional couplers.

2. The Mach-Zehnder interferometer optical modulator according to claim 1 wherein said circuit is coupled in a control loop with said phase comparator.

3. The Mach-Zehnder interferometer optical modulator according to claim 1 wherein said phase comparator further comprises an electrical circuit configured to supply an electrical signal based upon a difference between electrical signals produced by said two photodiodes representative of an optical phase difference.

4. The Mach-Zehnder interferometer optical modulator according to claim 1 comprising, between one of the optical inputs of said phase comparator and the second corresponding channel of the first or second directional coupler, an intermediate directional coupler configured so that a phase difference between the two optical waves incident on the inputs of said phase comparator is equal to 180°.

5. The Mach-Zehnder interferometer optical modulator according to claim 1 wherein said separation unit and said optical wave junction unit each comprises a respective directional coupler; and wherein said circuit is configured to bias said first and second optical phase adjustment diodes to introduce a 90° phase delay relative to each other.

6. The Mach-Zehnder interferometer optical modulator according to claim 1 wherein said separation unit comprises a directional coupler; wherein said optical wave junction unit comprises a Y-combiner; and wherein said circuit is configured to bias said first and second phase adjustment diodes to apply a same phase delay.

7. A Mach-Zehnder interferometer optical modulator comprising:
   an optical separation unit configured to separate an incoming optical wave into a first and a second optical wave;
   a first and a second optical phase adjusting diode respectively in paths of the first and second optical waves;
   a first and a second optical directional coupler, each having first and second coupled channels, the first channels being coupled respectively in paths of the first and second optical waves after the first and second phase adjusting diodes;
   a first and a second optical phase modulation diode respectively in the paths of the first and second optical waves after the first and second optical directional couplers;
   a third optical directional coupler having two coupled channels respectively defining two optical inputs coupled to the second coupled channels of said first and second optical directional couplers,
   two photodiodes configured to respectively receive optical outputs of the two coupled channels of said third optical directional coupler;
   a circuit configured to electrically bias said first and second phase adjusting diodes based upon a difference between electrical signals produced by the two photodiodes; and
   an optical wave junction unit having two inputs coupled respectively to the first and second optical phase modulation diodes.

8. The Mach-Zehnder interferometer optical modulator according to claim 7 wherein said circuit is coupled in a control loop with said photodiodes.

9. The Mach-Zehnder interferometer optical modulator according to claim 7 comprising, between the third directional coupler and the second channel of one of the first and second directional couplers, an intermediate directional coupler configured so that a phase difference between the two optical waves incident on the channels of the third directional coupler is equal to 180°.

10. The Mach-Zehnder interferometer optical modulator according to claim 7 wherein said separation unit and said optical wave junction unit each comprises a respective directional coupler; and wherein said circuit is configured to bias said first and second optical phase adjustment diodes to introduce a 90° phase delay relative to each other.

11. The Mach-Zehnder interferometer optical modulator according to claim 7 wherein said separation unit comprises a directional coupler; wherein said optical wave junction unit comprises a Y-combiner; and wherein said circuit is configured to bias said first and second phase adjustment diodes to apply a same phase delay.

12. A Mach-Zehnder interferometer optical modulator comprising:
   an optical separation unit configured to separate an incoming optical wave into a first and a second optical wave;
   a first and a second optical phase adjusting diode respectively in paths of the first and second optical waves;
   a first and a second optical directional coupler, each having first and second coupled channels, the first channels being coupled respectively in paths of the first and second optical waves;
   a phase comparator comprising
      a third optical directional coupler having two coupled channels respectively defining two optical inputs coupled to the second coupled channels of said first and second optical directional couplers, and
      two photodiodes configured to respectively receive optical outputs of the two coupled channels of said third optical directional coupler;
   a circuit configured to electrically bias said first and second phase adjusting diodes based upon said phase comparator;

between one of the optical inputs of said phase comparator and the second corresponding channel of the first or second directional coupler, an intermediate directional coupler configured so that a phase difference between the two optical waves incident on the inputs of said phase comparator is equal to 180°;

an optical wave junction unit having two inputs coupled respectively to outputs of the first channels of said first and second directional couplers; and a first and a second optical phase modulation diode respectively inserted between said optical wave junction unit and said first and second directional couplers.

13. The Mach-Zehnder interferometer optical modulator according to claim 12 wherein said circuit is coupled in a control loop with said phase comparator.

14. The Mach-Zehnder interferometer optical modulator according to claim 12 wherein said phase comparator further comprises an electrical circuit configured to supply an electrical signal based upon a difference between electrical signals produced by said two photodiodes representative of an optical phase difference.

15. The Mach-Zehnder interferometer optical modulator according to claim 12 wherein said separation unit and said optical wave junction unit each comprises a respective directional coupler; and wherein said circuit is configured to bias said first and second optical phase adjustment diodes to introduce a 90° phase delay relative to each other.

16. The Mach-Zehnder interferometer optical modulator according to claim 12 wherein said separation unit comprises a directional coupler; wherein said optical wave junction unit comprises a Y-combiner; and wherein said circuit is configured to bias said first and second phase adjustment diodes to apply a same phase delay.

* * * * *